(12) United States Patent
Mukaida (10) Patent No.: US 8,200,892 B2
(45) Date of Patent: *Jun. 12, 2012

(54) MEMORY CONTROLLER, MEMORY SYSTEM WITH MEMORY CONTROLLER, AND METHOD OF CONTROLLING FLASH MEMORY

(75) Inventor: Naoki Mukaida, Tokyo (JP)

(73) Assignee: TDK Corporation, Tokyo (JP)

( * ) Notice: Subject to any disclaimer, the term of this patent is extended or adjusted under 35 U.S.C. 154(b) by 326 days.

This patent is subject to a terminal disclaimer.

(21) Appl. No.: 12/701,831

(22) Filed: Feb. 8, 2010

(65) Prior Publication Data

US 2010/0205357 A1 Aug. 12, 2010

(30) Foreign Application Priority Data

Feb. 9, 2009 (JP) ................................. 2009-027758

(51) Int. Cl.
*G06F 12/10* (2006.01)

(52) U.S. Cl. ......... 711/103; 711/165; 711/203; 711/206

(58) Field of Classification Search .................. 711/103, 711/165, 203, 206
See application file for complete search history.

(56) References Cited

U.S. PATENT DOCUMENTS

| | | | |
|---|---|---|---|
| 6,081,447 A | 6/2000 | Lofgren et al. | |
| 6,230,233 B1 | 5/2001 | Lofgren et al. | |
| 6,594,183 B1 | 7/2003 | Lofgren et al. | |
| 6,732,221 B2 | 5/2004 | Ban | |
| 6,763,424 B2 | 7/2004 | Conley | |
| 6,850,443 B2 | 2/2005 | Lofgren et al. | |
| 6,968,421 B2 | 11/2005 | Conley | |
| 6,985,992 B1 | 1/2006 | Chang et al. | |
| 7,657,702 B2 | 2/2010 | Conley | |
| 8,001,318 B1 * | 8/2011 | Iyer et al. | 711/103 |
| 8,060,718 B2 * | 11/2011 | Freitas et al. | 711/165 |
| 2006/0106972 A1 * | 5/2006 | Gorobets et al. | 711/103 |
| 2007/0103992 A1 | 5/2007 | Sakui et al. | |

(Continued)

FOREIGN PATENT DOCUMENTS

JP   A-2004-533029   10/2004

(Continued)

OTHER PUBLICATIONS

U.S. Appl. No. 12/701,789, filed Feb. 8, 2010, Mukaida et al.

(Continued)

*Primary Examiner* — John Lane
(74) *Attorney, Agent, or Firm* — Posz Law Group, PLC (57) ABSTRACT

In the control of the number of program-erase cycles, when assigning a logical block (LB) to a physical block (PB), the number of program-erase cycles of a first PB and that of a second PB are compared, which first PB is a free PB of which the number of program-erase cycles is the smallest among that of free PBs, which second PB is a PB earliest assigned a LB among PBs each assigned a LB. As a result, in a case where the number of program-erase cycles of the first PB is larger by a predetermined value or more than that of the second PB, data stored in the second PB are transferred to a free PB of which the number of program-erase cycles is the largest among free PBs, and then the LB is assigned to the second PB.

6 Claims, 5 Drawing Sheets

U.S. PATENT DOCUMENTS

| | | | |
|---|---|---|---|
| 2008/0140918 A1* | 6/2008 | Sutardja | 711/103 |
| 2009/0113121 A1* | 4/2009 | Lee et al. | 711/103 |
| 2009/0138654 A1* | 5/2009 | Sutardja | 711/103 |
| 2009/0254729 A1* | 10/2009 | Lin et al. | 711/170 |
| 2010/0017555 A1* | 1/2010 | Chang et al. | 711/103 |
| 2010/0115186 A1* | 5/2010 | Chang et al. | 711/103 |
| 2010/0185805 A1* | 7/2010 | Chen et al. | 711/103 |
| 2011/0271046 A1* | 11/2011 | Iyer et al. | 711/103 |

FOREIGN PATENT DOCUMENTS

| | | |
|---|---|---|
| JP | A-2005-190288 | 7/2005 |
| JP | 2007-133683 A | 5/2007 |

OTHER PUBLICATIONS

Notice of Allowance mailed on Feb. 22, 2012 from the U.S. Patent Office in related U.S. Appl. No. 12/701,789.

* cited by examiner

| PBA | LINK NUMBER | | THE NUMBER OF PROGRAM-ERASE CYCLES |
|---|---|---|---|
| #0 | #118 | #572 | 1000 |
| #1 | #207 | #934 | 504 |
| #2 | #71 | #1043 | 378 |
| #3 | #199 | #556 | 468 |
| #4 | #267 | #734 | 1125 |
| #5 | #345 | #885 | 278 |
| . | . | . | . |
| . | . | . | . |

PRIORITY MANAGEMENT

| HIGHEST | #36 |
|---|---|
| LOWEST | #857 |

FREE BLOCK MANGEMENT

| HIGHEST | #753 |
|---|---|
| LOWEST | #38 |

MEMORY CONTROLLER, MEMORY SYSTEM WITH MEMORY CONTROLLER, AND METHOD OF CONTROLLING FLASH MEMORY

CROSS-REFERENCE TO PRIOR AND RELATED APPLICATIONS

This application relates to and claims the benefit of priority from Japanese Patent Application number 2009-27758, filed on Feb. 9, 2009, the entire disclosure of which is incorporated herein by reference. This application is also related to U.S. patent application Ser. No. 12/701,789, filed on Feb. 8, 2010 entitled MEMORY CONTROLLER, MEMORY SYSTEM WITH MEMORY CONTROLLER, AND METHOD OF CONTROLLING FLASH MEMORY, and to U.S. patent application Ser. No. 12/656,851, filed on Feb. 18, 2010 entitled MEMORY CONTROLLER, MEMORY SYSTEM WITH MEMORY CONTROLLER, AND METHOD OF CONTROLLING FLASH MEMORY.

BACKGROUND

The present invention generally relates to a memory controller for a flash memory, a flash memory system having the memory controller, and a method of controlling the flash memory.

In a memory system employing a flash memory, wear leveling is applied in order to even out the number of program-erase cycles (the number of times of execution of data erasing) among physical blocks in a flash memory, as shown in Reference 1 (JP-A-2007-133683).

There are substantially two wear leveling modes. One is called a dynamic wear leveling or a passive wear leveling, hereinafter referred as a "dynamic wear leveling", and the other is called a static wear leveling or an active wear leveling, hereinafter referred as a "static wear leveling". The dynamic wear leveling is to even out the number of program-erase cycles among physical blocks except static physical blocks. The static wear leveling is to even out the number of program-erase cycles among physical blocks including the static physical blocks. Each of the static physical blocks is a physical block storing static data, which are rarely updated or rewritten.

In the static wear leveling, static data stored in a static physical block are transferred to another physical block in order to store static data in a physical block of which the number of program-erase cycles is large. In the dynamic wear leveling, static data are not transferred unless it is necessary to rewrite them. Therefore, in a case where there are many static physical blocks (that is, where a ratio of static physical blocks to all physical blocks each storing data is high), it is preferable to apply the static wear leveling. And, in a case where there are few static physical blocks (that is, where a ratio of static physical blocks to all physical blocks each storing data is low), it is preferable to apply the dynamic wear leveling.

SUMMARY

In wear leveling shown in Reference 1 (JP-A-2007-133683), it is required that a user selects any one from 3 modes, that is the dynamic wear leveling, the static wear leveling, and combination of them. The selected mode is applied to a memory system. However, in general, it is difficult for a user to select an appropriate mode from the 3 modes for a memory system in consideration of a ratio of static data to be stored in the memory system to dynamic data to be stored in that, which dynamic data are often updated or rewritten.

In a case where an inappropriate selection from the 3 modes is made, an adverse effect is caused. For example, in a case where the dynamic wear leveling is selected for a memory system to be stored data of which most data are static data, the number of program-erase cycles of a physical block not having static data increases noticeably; in a case where the static wear leveling is selected for a memory system to be stored data of which most data are not static data, useless data transferring is often performed between physical blocks.

Therefore, the object of the present invention is to resolve a problem that the extreme evenness of the number of program-erase cycles among physical blocks occur, and to slow the increase of the number of program-erase cycles as a whole (the sum total of the number of program-erase cycles of each physical block) in comparison with a case where common wear leveling are applied, without making an user select a wear leveling mode.

According to the first aspect, a memory controller for controlling access to one or more flash memories, in which data erasing is performed in physical blocks, comprising:

a logical block management unit which forms plural logical blocks each composed of plural logical sectors to each of which a logical address for a host system is assigned;

a program-erase cycles management unit which manages a number of program-erase cycles of each physical block;

a first search unit which searches out a first physical block and a second physical block, which first physical block is a free physical block of which the number of program-erase cycles is the smallest among free physical blocks, which second physical block is a free physical block of which the number of program-erase cycles is the largest among free physical blocks;

a assignment unit which assigns a logical block to a physical block, which logical block is composed of plural logical sectors to each of which a logical address for a host system is assigned;

a second search unit which searches out a third physical block to which a logical block is assigned earliest among physical blocks to each of which a logical block is assigned;

a data writing unit which, in response to a request issued by the host system, identifies a logical block including a logical sector corresponding to a logical address pertaining to the request and stores data provided from the host system in a physical block corresponding to the logical block identified;

a determination unit which makes a determination whether or not the number of program-erase cycles of the first physical block is larger by a predetermined value or more than the number of program-erase cycles of the third physical block; and a data transfer unit which performs data transfer for transferring data stored in the third physical block to the second physical block;

wherein, when the assignment unit assigns a logical block to a physical block, the determination unit makes the determination; and wherein, in a case where the determination is positive, the assignment unit assigns the logical block to the third physical block after completing the data transfer, wherein, in a case where the determination is negative, the assignment unit assigns the logical block to the first physical block.

According to the second aspect, a memory controller for controlling access to one or more flash memories, in which data erasing is performed in physical blocks, comprising:

a logical block management unit which forms plural logical blocks each composed of plural logical sectors to each of which a logical address for a host system is assigned;

a virtual block management unit which forms plural virtual blocks into which physical blocks are divided;

a program-erase cycles management unit which manages the number of program-erase cycles of each virtual block;

a first search unit which searches out a first virtual block and a second virtual block, which first virtual block is a free virtual block of which the number of program-erase cycles is the smallest among free virtual blocks, which second virtual block is a free virtual block of which a number of program-erase cycles is the largest among free virtual blocks;

a assignment unit which assigns a logical block to a virtual block which logical block is composed of plural logical sectors to each of which a logical address for a host system is assigned;

a second search unit which searches out a third virtual block to which a logical block is assigned earliest among virtual blocks to each of which a logical block is assigned;

a data writing unit which, in response to a request issued by the host system, identifies a logical block including a logical sector corresponding to a logical address pertaining to the request and stores data provided from the host system in a virtual block corresponding to the logical block identified;

a determination unit which makes a determination whether or not the number of program-erase cycles of the first virtual block is larger by a predetermined value or more than the number of program-erase cycles of the third virtual block; and a data transfer unit which performs data transfer for transferring data stored in the third virtual block to the second virtual block;

wherein, when the assignment unit assigns a logical block to a virtual block, the determination unit makes the determination; and wherein, in a case where the determination is positive, the assignment unit assigns the logical block to the third virtual block after completing the data transfer, wherein, in a case where the determination is negative, the assignment unit assigns the logical block to the first physical block.

In more detail, a free physical block of which the number of program-erase cycles is the smallest among that of free physical blocks and a physical block which has earliest assigned a logical block among physical blocks assigned a logical block are identified, and then the number of program-erase cycles of the former ("the free physical block identified") is compared with that of the letter ("the physical block identified"). As a result, in a case where the number of program-erase cycles of "the free physical block identified" is larger by a predetermined value or more than that of "the physical block identified", data stored in "the physical block identified" are transferred to a free physical block of which the number of program-erase cycles is the largest among that of free physical blocks.

That is, only when the uneven distribution of the number of program-erase cycles among physical blocks exceed a predetermined level, operations to reduce it are performed.

DETAILED DESCRIPTION OF THE EMBODIMENT

Figure 1:
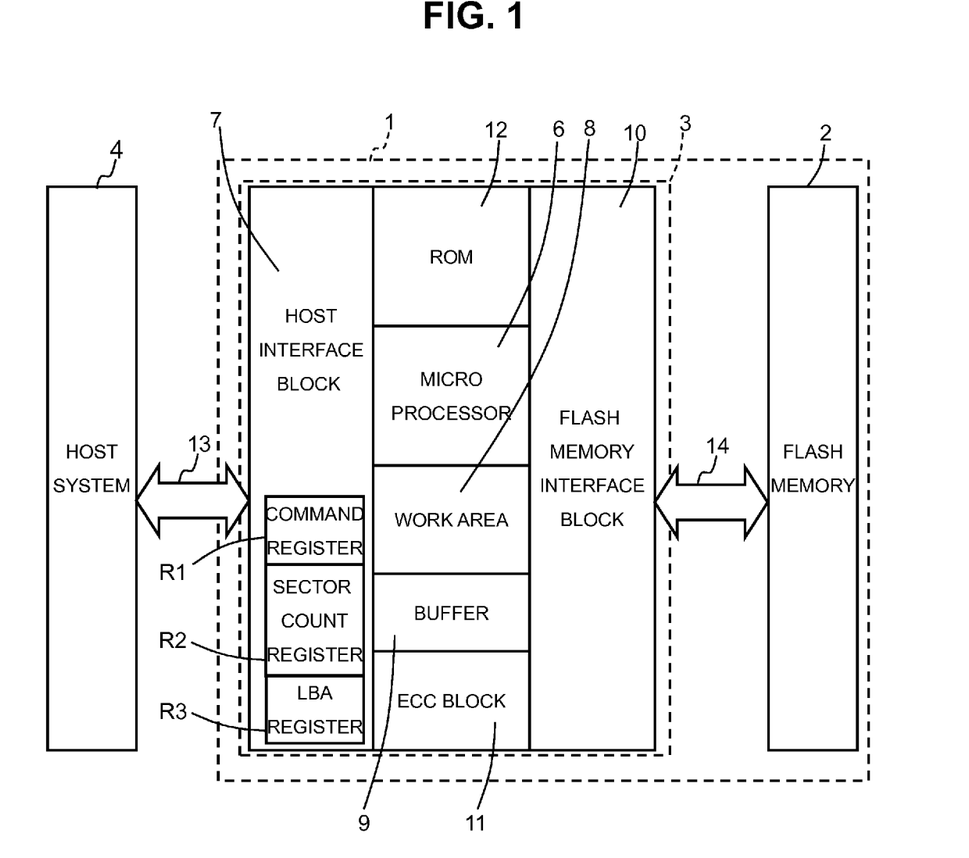
FIG. 1 shows a configuration of a flash memory system in accordance with an embodiment of the present invention.

FIG. 1 is a block diagram schematically showing the structure of a flash memory system 1 as specific embodiment of the present invention.

As shown in FIG. 1, the flash memory system 1 is composed of a flash memory 2 and a memory controller 3 to control the flash memory 2.

The flash memory system 1 is connected through an external bus 13 to a host system 4. The host system 4 is composed of a CPU (Central Processing Unit), a companion (peripheral) chip and so on. The CPU controls behavior of the host system 4. The companion (peripheral) chip controls data transfer between the host system 4 and the flash memory system 1. The host system 4 may be a personal computer processing various information, such as character information, audio information, image information and so on, or various types of information processing equipment, such as a digital camera.

As shown in FIG. 1, the memory controller 3 comprises a microprocessor 6, a host interface block 7, a SRAM (Static Random Access Memory) 8, a buffer memory 9, a flash memory interface block 10, an ECC block 11, and a ROM (Read Only Memory) 12. These functional blocks composing the memory controller 3 are integrated into one chip. Next, each functional block will is described in detail.

The host interface block 7 receives data, address information, external commands, and so on from the host system 4. Also, the host interface block 7 sends data, status information, and so on to the host system 4. The external command is for the host system 4 to control the memory controller 3. Data and so on inputted into the flash memory system 1 are transferred, through the host interface block 7 as an inlet for data, to a functional block such as a buffer memory 9. Also, data and so on outputted from the flash memory system 1 are transferred, through the host interface block 7 as an outlet for data, to the host system 4.

The host interface block 7 is provided with a command register R1, a sector count register R2, and a LBA register R3. The host system 4 writes a command code of an external command, such as write command or read command, to the command register R1, writes the number of sectors of data to be written or to be read to the sector count register R2, and writes a LBA (Logical Block Address) corresponding to a start address of data to be written or to be read to the LBA register R3. The LBA is an address assigned to a logical sector having a capacity of 1 sector (512 bytes).

The SRAM (Static Random Access Memory) 8 is a volatile memory for temporarily holding data required for controlling the flash memory 2. For example, a defective block table, an address translation table, a search table and so on are made up and updated on the SRAM 8. Hereupon, the defective block table is to manage information designating a defective physical block; the address translation table is to manage information indicating the relationship between logical blocks, each composed plural logical sectors, and physical blocks; The search table is to search a physical block which is in erased state, or which stores only needless data.

The buffer memory 9 is a volatile memory for temporarily holding data to be written to flash memory 2, or data read from the flash memory 2.

The flash memory interface block 10 controls transfer of data, address information, status information, internal commands and so on, between the memory controller 3 and the flash memory 2. The internal commands are for the memory controller 3 to control the flash memory 2, that is, the flash memory 2 works according to the internal command.

The ECC block 11 generates an ECC (Error Correcting Code) pertaining to data to be written to the flash memory 2. Data are stored together with an ECC pertaining thereto. Further, the ECC block 11 detects and corrects bit errors in data read from the flash memory 2 on a basis of an ECC pertaining to the data.

The ROM 12 is a nonvolatile memory, and stores firmware required for controlling the flash memory 2. Incidentally, only minimum firmware required for booting the flash memory system 1 may be stored in the ROM 12 and the other firmware may be stored in the flash memory 2.

A microprocessor 6 reads a program code from the ROM 12 or the flash memory 2, and controls all functional blocks included in the memory controller 3 according to the program code read. The program code specifies behavior of the microprocessor 6. According to the program code, the microprocessor 6 controls access to the flash memory 2. Incidentally, in a case where a program code is stored in the flash memory 2, the program code is read from the flash memory 2 and held in the SRAM 8 when the flash memory system 1 is booted.

The flash memory 2 is NAND type flash memory, and comprises a register and a memory cell array composed of a plurality of memory cells arranged in a matrix. The memory cell array comprises a plurality of memory cell strings and a plurality of word lines. The memory cell strings are each composed of a plurality of memory cells connected in series. The word lines are used to select a memory cell from the each memory cell string. In data writing (programming), data retained in the register are stored in the memory cells selected by using the word lines. In data reading, data read from the memory cells selected by using the word lines are retained in the register. Incidentally, in common NAND type flash memories, there are flash memories composed of memory cells of SLC (Single Level Cell) type and flash memories composed of memory cells of MLC (Multi Level Cell) type.

In a NAND type flash memory, data reading and data writing are performed in pages (physical pages), data erasing is performed in blocks (physical blocks), each physical page comprises a user area and a redundant area, and each physical block is composed of plural physical pages. For example, a physical page comprises a user area having a capacity of 4 sectors (2048 bytes) and a redundant area having a capacity of 64 bytes, and a physical block comprises 64 physical pages. A user area stores data provided from the host system 4, and is treated as comprising plural of sector areas each having a capacity of 1 sector (512 bytes). A redundant area stores additional data, to which data stored in a user area pertains, such as an ECC (Error Correcting Code), logical address information, or a block status (flag).

The logical address information is information for identifying a logical block corresponding to a physical block with it. The block status is a flag for indicating whether or not a physical block with it is a defective physical block, which is not able to normally perform data writing (programming) and so on. Incidentally, among defective blocks, there are an initial defective block and a running defective block. The initial defective block is a defective block detected before the flash memory is shipped out of the factory. The running defective block is a defective block generated during use. A block status indicating the initial defective block is written before shipping. In flash memories of some manufacturers, a block status indicating the initial defective block is written to a user area. A criterion to determine whether or not a physical block is the running defective block is a matter of design.

In this embodiment, when performing data writing operations, the host system 4 writes a command code of a write command to the command register R1, writes the number of sectors of write data to the sector count register R2, and writes a LBA corresponding to a start address of the write data to the LBA register R3. Logical sectors corresponding to the write data are identified on a basis of information held in the sector count register R2 and the LBA register R3, and the write data are written to a physical block corresponding to a logical block including the identified logical sectors.

In a case where there are plural logical blocks including the identified logical sectors, data writing operations are performed in the logical blocks. For example, In a case where there are 2 logical blocks including the identified logical sectors, data writing operations corresponding to one logical block of the 2 logical blocks and data writing operations corresponding to the other logical block of the 2 logical blocks are performed separately. In the data writing operations, data corresponding to logical sectors included in the one logical block are written to a physical block corresponding to the one logical block, and data corresponding to logical sectors included in the other logical block are written to a physical block corresponding to the other logical block.

The host system manages address space by assigning LBAs (logical block addresses) to each logical sector having a capacity of 1 sector (512 bytes). The memory controller divides logical sectors into logical blocks, and assigns one logical block to one or more physical blocks.

The relationship between logical blocks and physical blocks may be managed in zones each including plural logical blocks. Specifically, logical blocks are divided into logical zones, and address translation tables are made up and updated in the logical zones.

The address translation tables are made up and updated on the SRAM 8. The address translation tables are made up on a basis of logical address information stored in a redundant area of a physical page in a physical block when the memory system 1 is booted or when the address translation tables are required respectively. In order to save time to make up the address translation tables, the address translation tables may be stored in the flash memory 2, and may be read from the flash memory 2 when the address translation tables are required.

In a case where the address translation tables are stored in the flash memory 2, the latest address translation tables are stored in the flash memory 2 anytime in order to avoid losing the address translation tables when a power failure occurs. That is, every time the relationship between logical blocks and physical blocks changes and a address translation table relating to the change of the relationship is updated, the updated address translation tables are stored in the flash memory 2. Operations for storing the address translation tables are performed in logical zones (or address translation tables) as well as operations for making up or updating them.

By referring to FIG. 2, a specific example of the relationship between logical blocks and physical blocks will be described. Further, in the following explanation, an object X of which ID is #Y may be called a "X of ID #Y". For example, a logical sector of which LBA (Logical Block Address) is #0 may be called "a logical sector of LBA #0", and a physical block of which PBA (Physical Block Address) is #234 may be called "a physical block of PBA #234".

Figure 2:
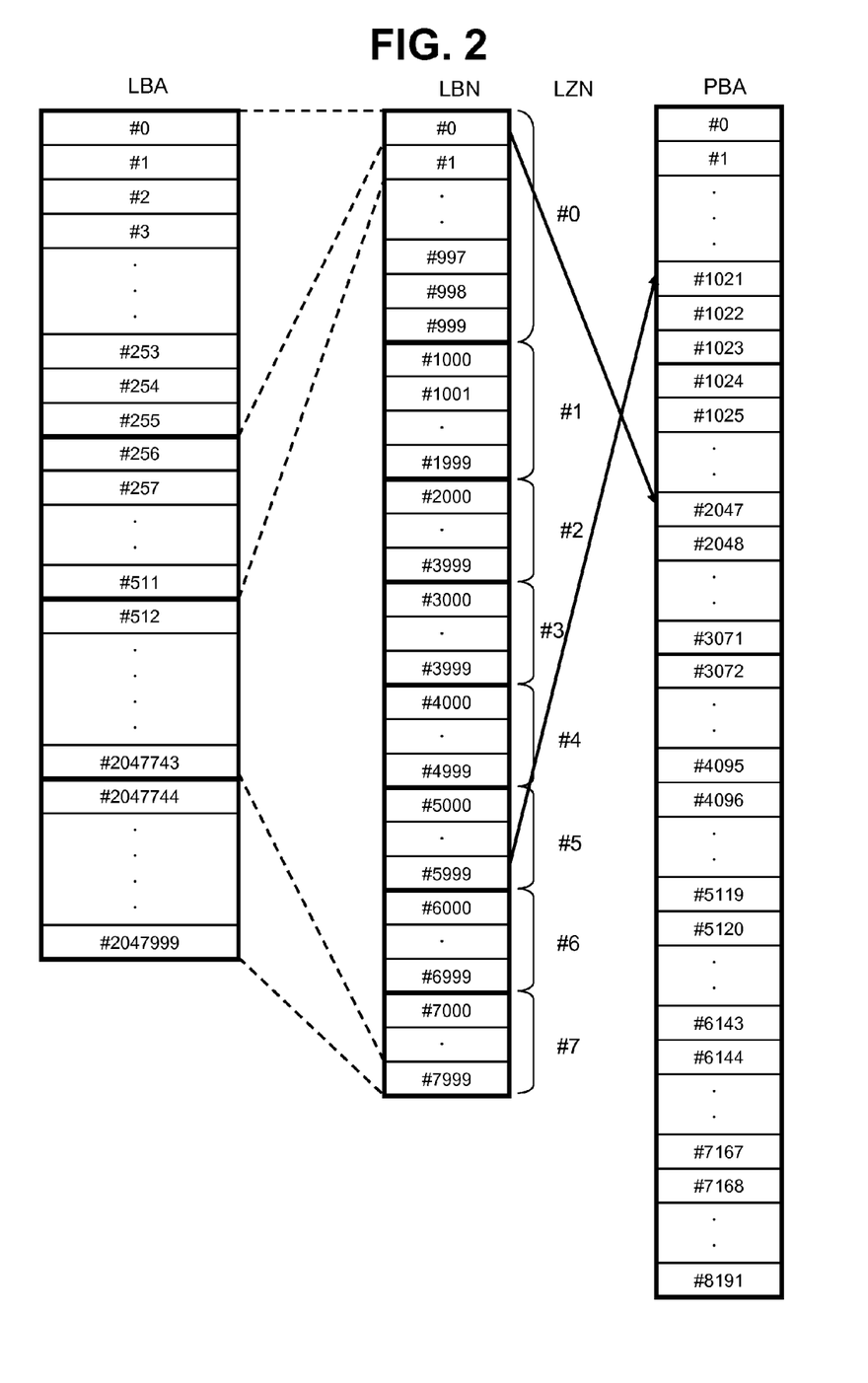
FIG. 2 is an illustration for relationship logical blocks and physical blocks.

In FIG. 2, 2048000 logical sectors of LBA #0 to #2047999 are allocated to 8192 physical blocks in the flash memory 2.

Plural logical blocks each comprising plural logical sectors are formed (Plural logical sectors are divided into plural logical blocks). LBN (Logical Block Number) which is a serial number for a logical block is assigned to each logical block. Also, a logical block is assigned to a physical blocks in the flash memory 2. In this example, 2408000 logical sectors are divided into 8000 logical blocks, each of which is formed of 256 logical sectors assigned serial LBAs. Specifically, 256 logical sectors of LBA #0 to #255 compose a logical block of LBN #0; 256 logical sectors of LBA #256 to #511 compose a logical block of LBN #1. Similarly, the following logical blocks are formed. As a result, 8000 logical blocks of LBN #0 to #7999 are formed of 2408000 logical sectors of LBA #0 to #2047999.

Further, plural logical zones each comprising plural logical blocks are formed (Plural logical blocks are divided into plural logical zones). LZN (Logical Zone Number) which is a serial number for a logical zone is assigned to each logical zone. In this example, each of which is formed of 1000 logical blocks, that is, 8000 logical blocks are evenly divided into 8 logical zones. Specifically, 1000 logical blocks of LBN #0 to #999 compose a logical zone of LZN #0; 1000 logical blocks of LBN #1000 to #1999 compose a logical zone of LZN #1, 1000 logical blocks of LBN #2000 to #2999 compose a logical zone of LZN #2. Similarly, the following logical zones are formed. As a result, 8 logical zones of LZN #0 to #7 are formed of 8000 logical blocks of LBN #0 to #7999.

The flash memory 2 comprise 8192 physical blocks each having PBA (physical block address) which is a unique address in the flash memory 2. In general, a flash memory has some initial defective physical blocks, and physical blocks in a flash memory have finite program-erase cycling capability. Therefore, many physical blocks become a defective physical block after exceeding their capability limits. That is, by performing data programming and data erasing, physical blocks degrade and wear out. As a result, they become a defective physical block (running defective physical block).

In general, there are a flash memory with single level cells and a flash memory with multi level cells. Data retention time in a flash memory with multi level cells is shorter than that in a flash memory with single level cells. Also, according as the number of program-erase cycles (the number of times of execution of data erasing) increases, data retention time shortens. And especially when the number of program-erase cycles is getting close to a capability limit or exceeds a capability limit, data retention time shortens markedly. In a flash memory with multi level cells, the reduction in data retention time is a serious problem.

When storing data in flash memory 2, data are stored in a physical block to which a logical block corresponding to the data is assigned. The relationship between a logical block and a physical block to which the logical block is assigned is managed on a basis of above the above address translation table. When assigning a logical block to a free physical block, the free physical block is searched out with the above search table. The free physical block is in erased state or is a physical block storing only needless data. In a free physical block storing needless data, data erasing is performed before data writing.

When updating data ("old data") stored in flash memory 2, a logical block corresponding to "the old data" is newly assigned to a physical block, which is a free physical block, and then "new data" corresponding to the same logical block as "the old data" are stored in the physical block. Because "new data" stored in the physical block replace "the old data", "the old data" is treated as ineffective data. When all data stored in a previous physical block storing "the old data" becomes ineffective data, the previous physical block becomes a free physical block.

In a case where there are plural sector of data corresponding to the same logical sector, the newest one of them is effective data and the other of them ineffective data. Therefore, when all data stored in a physical block become ineffective data, the physical block becomes a free physical block. That is, a physical block not storing effective data is treated as a free physical block. Incidentally, the free physical block is subjected to data erasing before a logical block is newly assigned to it. The data erasing may be performed just after becoming the free physical block or may be performed just before assigning a logical block.

When updating data stored in a flash memory, a physical block to which new data are written is usually different from a physical block storing old data corresponding to the same logical block as the new data. Therefore, in a logical block corresponding to dynamic data to be often updated, a physical block to which the logical block is assigned often change. Also, in a logical block corresponding to static data to be rarely updated, a physical block to which the logical block is assigned rarely changes.

In such the data updating, by assigning a logical block corresponding to dynamic data to a physical block, the number of program-erase cycles of the physical block increases rapidly. Also, by assigning a logical block corresponding to static data to a physical block, the number of program-erase cycles of the physical block increases slowly. Therefore, unless wear leveling operations are performed, a difference between the number of program-erase cycles of a physical block having a tendency to be assigned a logical block corresponding to dynamic data and that of a physical block having a tendency to be assigned a logical block corresponding to static data becomes large. As a result, the only physical blocks having a tendency to be assigned a logical block corresponding to dynamic data wear out prematurely, and then the life of a flash memory shortens.

To avoid the above mentioned problem, the memory controller 3 according to the present embodiment performs the following wear leveling operations. In this wear leveling operations, when the number of program-erase cycles of a free physical block most often subjected to data erasing among free physical blocks is larger by a predetermined value or more than the number of program-erase cycles of a physical block to which a logical block is assigned earliest among physical blocks each to which a logical block is assigned, data stored in the physical block are transferred to a free physical block least often subjected to data erasing among free physical blocks. Next, this wear leveling operations will be described in detail by referring to FIG. 3 and FIG. 4.

Figure 3:
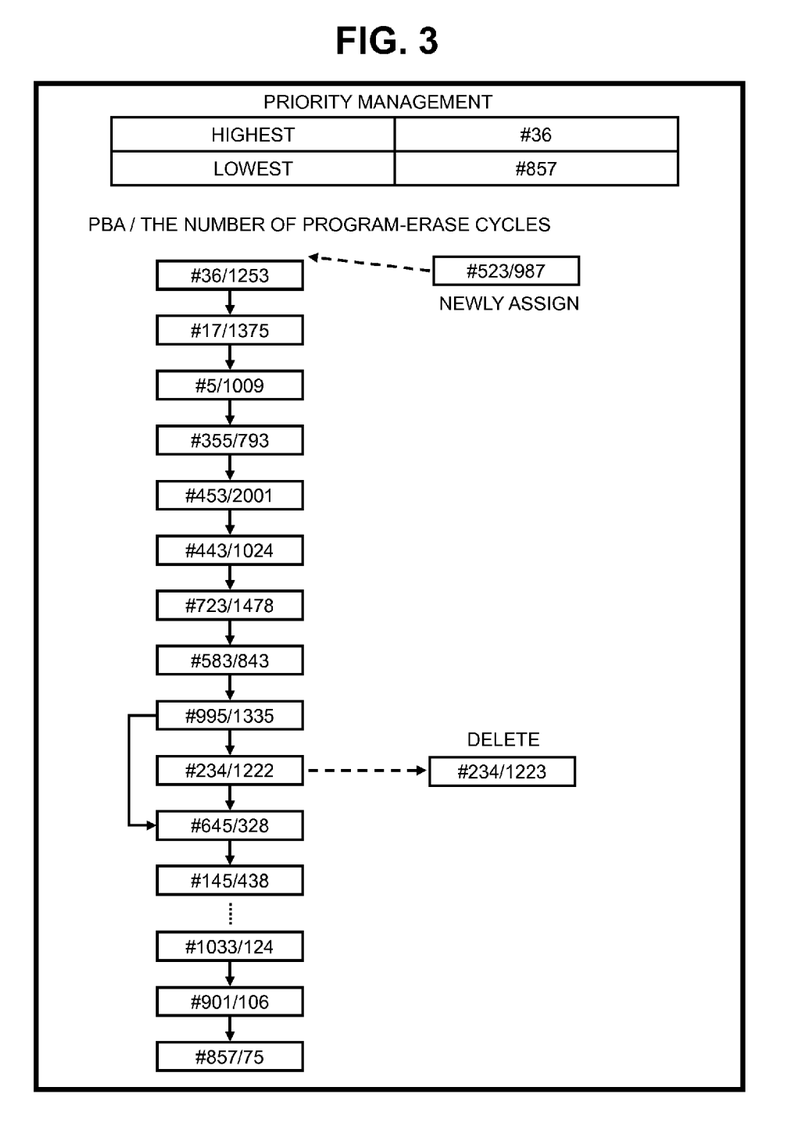
FIG. 3 is an illustration for the management for the priority order.
Figure 4:
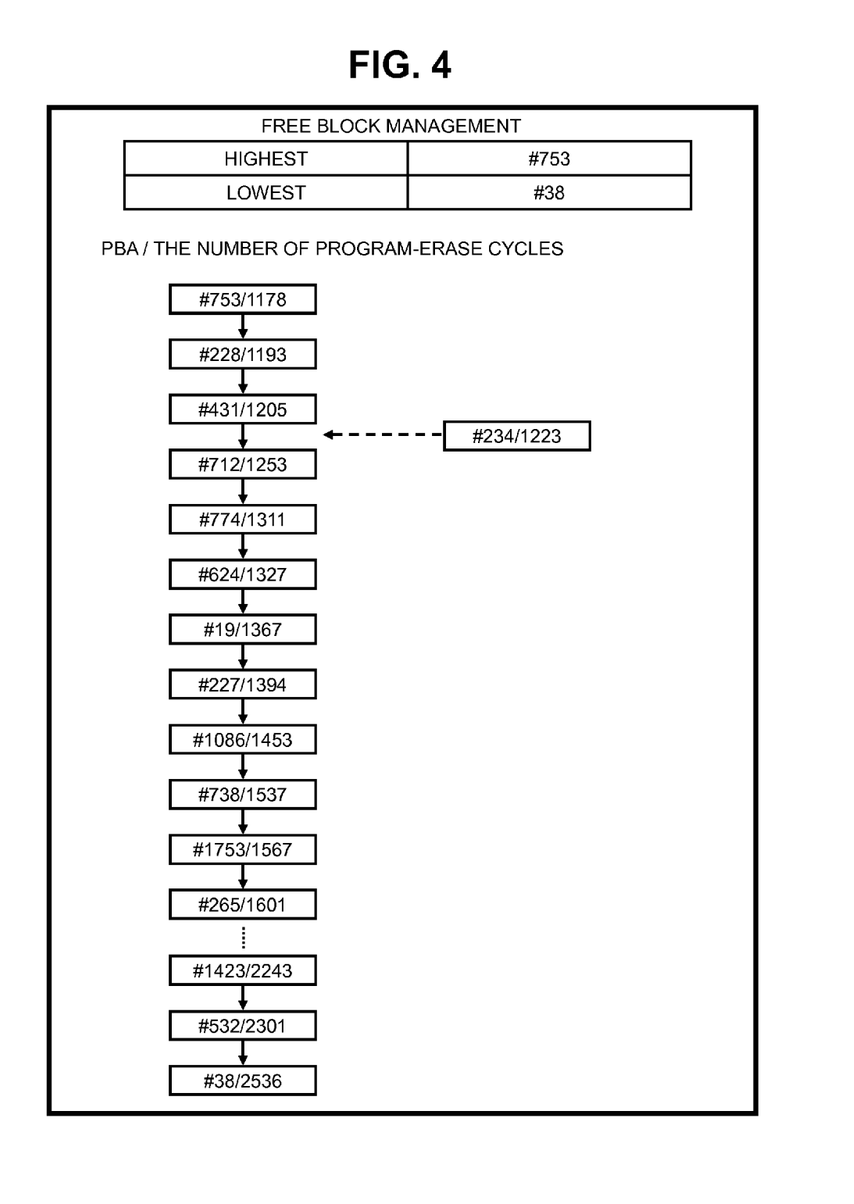
FIG. 4 is an illustration for the management for free physical blocks.

In this wear leveling operations, priority order shown in FIG. 3 and priority order shown in FIG. 4 are managed. In priority order shown in FIG. 3, hereinafter referred as "assignment order", physical blocks storing effective data (the physical blocks each to which a logical block is assigned) are prioritized. In priority order shown in FIG. 4, hereinafter referred as "wear order", free physical blocks are prioritized.

By referring to FIG. 3, the assignment order will be described. In the assignment order, when assigning a logical block to a physical block, the highest priority is given to the physical block. That is, according as order in which a logical block is assigned to a physical block is later, a priority of the physical block is higher. Also, according as order in which a logical block is assigned to a physical block is earlier, a priority of the physical block is lower. Therefore, a physical block to which a logical block is assigned most recently has the highest priority, and a physical block to which a logical block is assigned earliest has the lowest priority. The memory controller 3 identifies a physical block to which a logical block is assigned earliest on a basis of the assignment order, which physical block corresponds to a physical block having the lowest priority.

In the assignment order shown in FIG. 3, the physical block of PBA #36 has the highest priority, and the physical block of PBA #857 has the lowest priority. Therefore, it is found that the physical block of PBA #36 is a physical block to which a logical block is assigned most recently, and the physical block of PBA #857 is a physical block to which a logical block is assigned earliest. Hereupon, if a logical block is newly assigned to the physical block of PBA #523, the highest priority is given to the physical block of PBA #523. As a result, a priority of the physical block of PBA #36 becomes the second highest. Also, if the physical block of PBA #234 is subject to data erasing, that is, data stored in the physical block of PBA #234 are erased, the physical block of PBA #234 is excluded from an object of the assignment order. As a result, the physical block of PBA #645 has a priority next to a priority of the physical block of PBA #995 in the assignment order, that is, a priority of the physical block of PBA #645 is lower by one level than a priority of the physical block of PBA #995.

By referring to FIG. 4, the wear order will be described. The wear order depends on the number of program-erase cycles. That is, according as the number of program-erase cycles of a physical block is smaller, a priority of the physical block is higher. Also, according as the number of program-erase cycles of a physical block is larger, a priority of the physical block is lower. Therefore, the number of program-erase cycles of a physical block having the highest priority is the smallest among that of free physical blocks. Also, the number of program-erase cycles of a physical block having the lowest priority is the largest among that of free physical blocks.

In the wear order shown in FIG. 3, the physical block of PBA #753 has the highest priority, and the physical block of PBA #38 has the lowest priority. Therefore, it is found that the number of program-erase cycles of the physical block of PBA #753 is the smallest among that of free physical blocks, and the number of program-erase cycles of the physical block of PBA #38 is the largest among that of free physical blocks. Specifically, the number of program-erase cycles of the physical block of PBA #753, which has the highest priority, is 1178, and the number of program-erase cycles of the physical block of PBA #228, which has the second highest priority, is 1193. Similarly, in the following physical blocks, according as a priority of a physical block is lower, the number of program-erase cycles of the physical block is larger. The number of program-erase cycles of the physical block of PBA #38, which has the lowest priority, is 2536.

When a physical block to which a logical block is assigned becomes a free physical block, the physical block is excluded from an object of the assignment order and becomes treated as an object of the wear order. For example, when the physical block of PBA #234 becomes a free physical block, the physical block of PBA #234 becomes out of the assignment order and becomes treated as an object of the wear order. In the wear order of FIG. 4, the number of program-erase cycles of the physical block of PBA #234 is 1223, that of PBA #431 is 1205, and that of PBA #712 is 1253. Therefore, a priority given to the physical block of PBA #234 is lower by one level than a priority of the physical block of PBA #431 and higher by one level than that of PBA #712. That is, the physical block of PBA #234 has a priority between a priority of the physical block of PBA #431 and that of #721.

Next, operation, in response to an access request from the host system 4, performed by the memory controller 3 will be described. In data writing to the flash memory 2, the memory controller 3 identifies logical sectors corresponding to data provided from the host system 4 on a basis of information in the sector count register R2 and the LBA register R3, and then determines whether the data can be written to a physical block corresponding to a logical block including the identified logical sectors. In a case where there is not a physical block to which a logical block including the identified logical sectors is assigned, or in a case where there is not a free area storing the data in a physical block corresponding to the logical block including the identified logical sectors, the memory controller 3 determines a physical block to be assignment destination for the logical block.

The physical block is determined in the following manner. In the determination, the memory controller 3 identifies a free physical block of which the number of program-erase cycles is the smallest among that of free physical blocks. The free physical block corresponds to a free physical block having the highest priority in the wear order. The memory controller 3 also identifies a physical block to which a logical block is assigned earliest among physical blocks to each of which a logical block is assigned. The physical block corresponds to a physical block having the lowest priority in the assignment order.

Moreover, the memory controller 3 compares the number of program-erase cycles of the free physical block, having the highest priority in the wear order, with that of the physical block, having the lowest priority in the assignment order. In the comparison, it is determined whether the number of program-erase cycles of the free physical block is larger by predetermined value than that of the physical block. The predetermined value is determined on a basis of a characteristic of a flash memory controlled by the memory controller 3.

As a result, in a case where a negative determination is made, that is, in a case where the number of program-erase cycles of the free physical block is not larger by predetermined value than that of the physical block, the logical block including the logical sectors corresponding to the data provided from the host system 4 is assigned to the free physical block. Therefore, the memory controller 3 stores the data in the free physical block. That is, in a case where a negative determination is made, the memory controller 3 assigns the logical block to the free physical block of which the number of program-erase cycles is the smallest among that of free physical blocks.

Also, in a case where a positive determination is made, that is, in a case where the number of program-erase cycles of the free physical block having the highest priority in the wear order is larger by predetermined value than that of the physical block, the memory controller 3 identifies a free physical block having the lowest priority in the wear order, and then transfers data from the physical block to the free physical block having the lowest priority. That is, data stored in a physical block having the lowest priority in the assignment order are transferred to a free physical block having the lowest priority in the wear order. The free physical block having the lowest priority in the wear order corresponds to a free physical block of which the number of program-erase cycles is the largest among that of free physical blocks. The physical block having the lowest priority in the assignment order corresponds to a physical block to which a logical block is assigned earliest among physical blocks to each of which a logical block is assigned. After the transfer is completed, the physical block having the lowest priority in the assignment order is subjected to data erasing and the logical block including the logical sectors corresponding to the data provided from the host system 4 is assigned to the physical block. Therefore, the memory controller 3 stores the data in the physical block to which the logical block is assigned (the physical block, until then, having the lowest priority in the assignment order). Incidentally, after the transfer, the free physical block having the lowest priority in the wear order is treated as a physical block to which a logical block, until then, corresponding the physical block having the lowest priority in the assignment order is assigned.

That is, in a case where a positive determination is made, data transfer is performed from a physical block to which a logical block is assigned earliest among physical blocks to each of which a logical block is assigned to a free physical block of which the number of program-erase cycles is the smallest among that of free physical blocks. After then, a different logical block from a logical block, until then, assigned the physical block is newly assigned to the physical block.

By performing the data transfer, an increase in the number of program-erase cycles of a destination physical block, to which data are transferred by data transfer, is controlled so that it becomes slow because there is a high probability that a source physical block, from which data are transferred by data transfer, stores static data or the like. The destination physical block corresponds to a free physical block of which the number of program-erase cycles is the largest among that of free physical blocks. The source physical block corresponds to a physical block to which a logical block is assigned earliest among physical blocks to each of which a logical block is assigned. Also, there is a high probability that the source physical block stores dynamic data. Therefore, by performing the data transfer, the difference between the maximum of the number of program-erase cycles and the minimum of that among physical blocks in the flash memory 2 is controlled so that it becomes smaller.

Next, above operations will be specifically described by referring to FIG. 3 and FIG. 4. In the following description, it is assumed that the predetermined value is 1000.

The memory controller 3 identifies the physical block of PBA #753 as a free physical block having the highest priority in the wear order (as a free physical block of which the number of program-erase cycles is the smallest among that of free physical blocks), and identifies the physical block of PBA #857 as a physical block having the lowest priority in the assignment order (as a physical block to which a logical block is assigned earliest among physical blocks to each of which a logical block is assigned). The memory controller 3 compares the number of program-erase cycles of the physical block of PBA #753 with the number of program-erase cycles of the physical block of PBA #857. As a result, the memory controller 3 determines that the number of program-erase cycles of the physical block of PBA #753 is larger by 1000 or more than that of the physical block of PBA #857, because the number of program-erase cycles of the physical block of PBA #753 is 1178 and the number of program-erase cycles of the physical block of PBA #857 is 75.

In response to the positive determination, the memory controller identifies the physical block of PBA #38 as a free physical block having the lowest priority in the wear order (as a free physical block of which the number of program-erase cycles is the largest among that of free physical blocks), and transfers data stored in the physical block of PBA #857 to the physical block of PBA #38. After the data transfer is completed, data stored in the physical block of PBA #857 is erased, and then a logical block including logical sectors corresponding to data provided from the host system 4 is newly assigned to the physical block of PBA #857.

By assigning the logical block to the physical block of PBA #857, the highest priority in the assignment order is given to the physical block of PBA #857, and then a priority of the physical block of PBA #901 changes from the second lowest to the lowest. In the next comparison of two physical blocks, the memory controller 3 identifies the physical block of PBA #753 as a free physical block having the highest priority in the wear order, and identifies the physical block of PBA #901 as a physical block having the lowest priority in the assignment order. Therefore, the memory controller 3 compares 1178 with 106 because the number of program-erase cycles of the physical block of PBA #753 is 1178 and the number of program-erase cycles of the physical block of PBA #901 is 106. As a result, because the positive determination is made, data stored in the physical block of PBA #901 are transferred to the physical block of PBA #532, which is a free physical block having the lowest priority in the wear order, and then a logical block is newly assigned to the physical block of PBA #901.

In a case where data transfer from a physical block having the lowest priority in the assignment order to a free physical block having the lowest priority in the wear order is performed, the free physical block becomes out of the wear order, and then a priority in the assignment order is given to the free physical block. For example, in a case where data transfer from the physical block of PBA # 857 to the physical block of PBA #38 is performed, the physical block of PBA #38 becomes out of the wear order and is treated as a physical block to which a logical block is newly assigned. Also, when a physical block to which a logical block is assigned becomes a free physical block because of data updating or the like, the physical block becomes out of the assignment order and becomes treated as an object of the wear order.

When updating data stored in a flash memory, a physical block to which new data are written is usually different from a physical block storing old data corresponding to the same logical block as the new data. Therefore, there is a tendency that a physical block to which a logical block corresponding to dynamic data is assigned does not stays under the assignment order for a long time, but that a physical block to which a logical block corresponding to static data is assigned stays under the assignment order for a long time. In consideration for the tendency, a physical block having the lowest priority in the assignment order is regarded as a static physical block, which is a physical block storing static data.

When assigning a logical block to a free physical block, a free physical block of which the number of program-erase cycles is small precedes a free physical block of which the number of program-erase cycles is large. Therefore, if there is high probability that a free physical block of which the number of program-erase cycles is small stores dynamic data, the number of program-erase cycles of the free physical block increases at a high rate. For this reason, in order to avoid storing static data in a free physical block of which the number of program-erase cycles is small, data transfer from a physical block regarded as a static physical block to a free physical block of which the number of program-erase cycles is large is performed. As a result, a free physical block of which the number of program-erase cycles is small has a tendency to store static data, and a free physical block of which the number of program-erase cycles is large has a tendency to store dynamic data.

Next, management of the number of program-erase cycles of each physical block, the assignment order, and the wear order will be described by referring to FIG. 5. A management table of FIG. 5 indicates a first link number, a second link number, and the number of program-erase cycles by a physical block in order of PBA (A management table of FIG. 7 has an entry for a first link number, an entry for a second link number, and an entry for the number of program-erase cycles by a physical block). The first link number of each physical block is PBA of a physical block of which a priority is higher by one level than that of the each physical block. The second link number of each physical block is PBA of a physical block of which a priority is lower by one level than that of the each physical block. Therefore, a physical block having the highest priority does not have the first link number, and a physical block having the lowest priority does not have the second link number. That is, the first link number and the second link number indicate a position in the assignment order with regard to physical blocks to each of which a logical block is assigned. Also, the first link number and the second link number indicate a position in the wear order with regard to free physical blocks.

Figure 5:
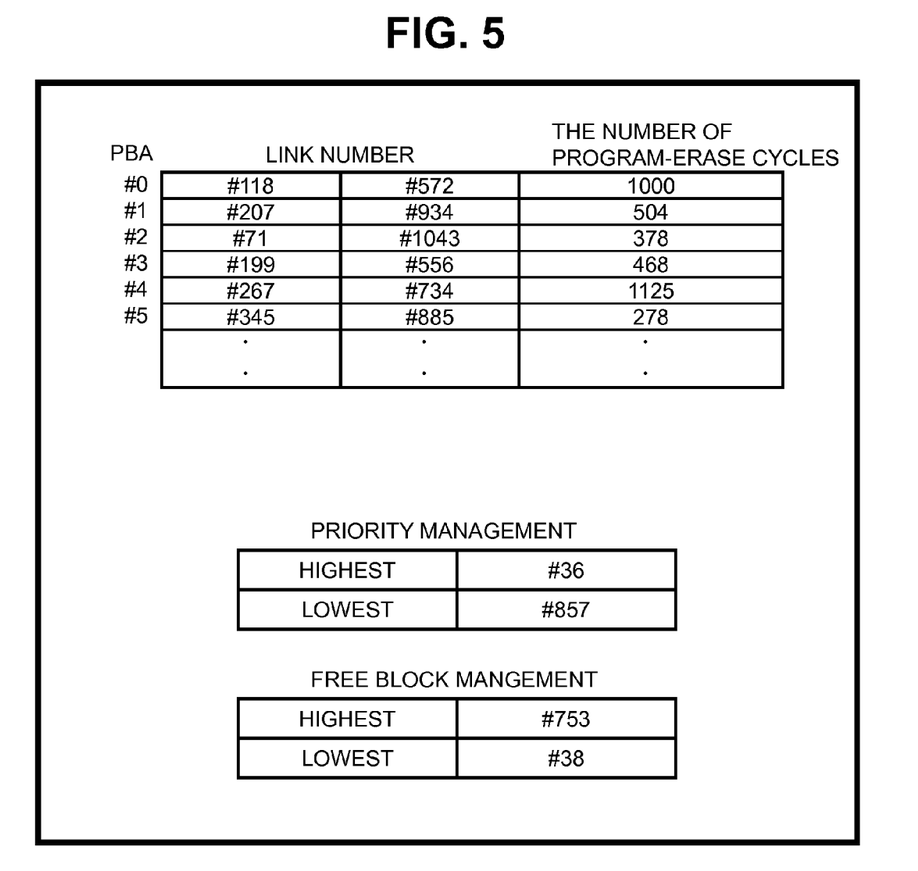
FIG. 5 shows tables used for the management for the priority order and the management for free physical blocks.

For example, by referring to the management table of FIG. 5, it is found that a priority of the physical block of PBA #118 is higher by one level than that of the physical block of PBA #0 and a priority of the physical block of PBA #572 is lower by one level than that of the physical block of PBA #0.

The management table of FIG. 5 has a top pointer and a bottom pointer for the assignment order and that for the wear order. The top pointer and the bottom pointer for the assignment order are to indicate a physical block having the highest priority and that having the lowest priority in the assignment order respectively. The top pointer and the bottom pointer for the wear order are to indicate a physical block having the highest priority and that having the lowest priority in the wear order respectively.

When a physical blocks having the highest priority changes to another physical block, PBA set in the top pointer changes to PBA of the another physical block. Also, when a physical blocks having the lowest priority changes to another physical block, PBA set in the bottom pointer changes to PBA of the another physical block.

In the assignment order, when assigning a logical block to a physical block, PBA of the physical block to which a logical block is just assigned is set in the top pointer. Also, when transferring data stored in a physical block having the lowest priority to a free physical block, PBA of a physical block, until then, having the second lowest priority is set in the bottom pointer.

In the wear order, when a physical block of which the number of program-erase cycles is smaller than that of a free physical block having the highest priority becomes a free physical block, PBA of the physical block just becoming a free physical block is set in the top pointer. Also, when assigning a logical block to a free physical block having the highest priority, PBA of a physical block, until then, having the second highest is set in the top pointer. Also, when a physical block of which the number of program-erase cycles is larger than that of a free physical block having the lowest priority becomes a free physical block, PBA of the physical block just becoming a free physical block is set in the bottom pointer. Also, when transferring data to a free physical block having the lowest priority, PBA of a physical block, until then, having the second lowest is set in the bottom pointer.

For example, when assigning a logical block to the physical block of PBA #753, PBA set in the top pointer for the assignment order is changed from #36 to #753 because the highest priority is given to the physical block of PBA #753. Also, #36 is set in an entry of the second link number of the physical blocks of PBA #753 and #753 is set in an entry of the first link number of the physical block of PBA #36 because a priority of the physical block of PBA #753 is the highest and a priority of the physical block of PBA #36 is the second highest. In this way, the physical block of PBA #753 has the second link number for the assignment order and is treated as an object of the assignment order.

When assigning a logical block to the physical block of PBA #753, the physical block of PBA #753 becomes out of the wear order. Therefore, a priority of the physical block of PBA #228, which, until then, has the second highest priority, changes to the highest. In response to the change, #228 is set in the top pointer for the wear order and PBA (#753) set in an entry of the first link number of the physical block of PBA #228 is erased. Incidentally, a physical block having the second highest priority, that is, the physical block of PBA #228 is identified on a basis of the second link number of a physical block having the highest priority, that is, the physical block of PBA #753.

In the number of program-erase cycles on the management table of FIG. 5, when a physical block is subjected to data erasing (data erasing is performed on a physical block), the number of program-erase cycles of the physical block is updated so that it increases by one. That is, when a physical block becomes a free physical block and becomes treated as an object of the wear order, the number of program-erase cycles of the physical block is updated.

In foregoing specification, specific embodiments of the present invention have been described. However, the scope of the present invention is not limited to the embodiment. Of course, various modifications and changes can be made without departing from the scope of the present invention.

For example, in the embodiments described above, management of the assignment order and the wear order is performed in physical blocks. However, in a case where a logical block is assigned to a virtual block composed of plural physical blocks and the relationship a logical block and the virtual block is managed, the management may be performed in virtual blocks. That is, a virtual block can be treated as one unit if each virtual block is composed of predetermined physical blocks. In this case, the first link number, the second link number, and the number of program-erase cycles are set in a management table by a virtual block. That is, a serial number assigned to each virtual block may be set as the first link number or the second link number on the management table and the number of program-erase cycles as a virtual block may be set in the management table.

Incidentally, management of the assignment order and the wear order may be performed in a different manner from the above as far as their object can be achieved, that is, as far as a physical block having the lowest priority in the assignment order, a physical block having the highest priority in the wear order, and a physical block having the lowest priority in the wear order can be identified.

What is claimed is:

1. A memory controller for controlling access to one or more flash memories, in which data erasing is performed in physical blocks, comprising:
   a logical block management unit which forms plural logical blocks each composed of plural logical sectors to each of which a logical address for a host system is assigned;
   a program-erase cycles management unit which manages a number of program-erase cycles of each physical block;
   a first search unit which searches out a first physical block and a second physical block, which first physical block is a free physical block of which the number of program-erase cycles is the smallest among free physical blocks, which second physical block is a free physical block of which the number of program-erase cycles is the largest among free physical blocks;

an assignment unit which assigns a logical block to a physical block, which logical block is composed of plural logical sectors to each of which a logical address for a host system is assigned;

a second search unit which searches out a third physical block to which a logical block is assigned earliest among physical blocks to each of which a logical block is assigned;

a data writing unit which, in response to a request issued by the host system, identifies a logical block including a logical sector corresponding to a logical address pertaining to the request and stores data provided from the host system in a physical block corresponding to the logical block identified;

a determination unit which makes a determination whether or not the number of program-erase cycles of the first physical block is larger by a predetermined value or more than the number of program-erase cycles of the third physical block; and a data transfer unit which performs data transfer for transferring data stored in the third physical block to the second physical block;

wherein, when the assignment unit assigns a logical block to a physical block, the determination unit makes the determination; and wherein, in a case where the determination is positive, the assignment unit assigns the logical block to the third physical block after completing the data transfer, wherein, in a case where the determination is negative, the assignment unit assigns the logical block to the first physical block.

2. A memory controller for controlling access to one or more flash memories, in which data erasing is performed in physical blocks, comprising:

a logical block management unit which forms plural logical blocks each composed of plural logical sectors to each of which a logical address for a host system is assigned;

a virtual block management unit which forms plural virtual blocks into which physical blocks are divided;

a program-erase cycles management unit which manages the number of program-erase cycles of each virtual block;

a first search unit which searches out a first virtual block and a second virtual block, which first virtual block is a free virtual block of which the number of program-erase cycles is the smallest among free virtual blocks, which second virtual block is a free virtual block of which a number of program-erase cycles is the largest among free virtual blocks;

an assignment unit which assigns a logical block to a virtual block which logical block is composed of plural logical sectors to each of which a logical address for a host system is assigned;

a second search unit which searches out a third virtual block to which a logical block is assigned earliest among virtual blocks to each of which a logical block is assigned;

a data writing unit which, in response to a request issued by the host system, identifies a logical block including a logical sector corresponding to a logical address pertaining to the request and stores data provided from the host system in a virtual block corresponding to the logical block identified;

a determination unit which makes a determination whether or not the number of program-erase cycles of the first virtual block is larger by a predetermined value or more than the number of program-erase cycles of the third virtual block; and a data transfer unit which performs data transfer for transferring data stored in the third virtual block to the second virtual block;

wherein, when the assignment unit assigns a logical block to a virtual block, the determination unit makes the determination; and wherein, in a case where the determination is positive, the assignment unit assigns the logical block to the third virtual block after completing the data transfer, wherein, in a case where the determination is negative, the assignment unit assigns the logical block to the first physical block.

3. A memory system comprising:
a memory controller according to claim 1; and
one or more flash memories to which access is controlled by the memory controller.

4. A memory system comprising:
a memory controller according to claim 2; and
one or more flash memories to which access is controlled by the memory controller.

5. A method for controlling access to one or more flash memories, in which data erasing is performed in physical blocks, comprising:

a logical block management step of forming plural logical blocks each composed of plural logical sectors to each of which a logical address for a host system is assigned;

a program-erase cycles management step of managing a number of program-erase cycles of each physical block;

a first search step of searching out a first physical block and a second physical block, which first physical block is a free physical block of which the number of program-erase cycles is the smallest among free physical blocks, which second physical block is a free physical block of which the number of program-erase cycles is the largest among free physical blocks;

an assignment step of assigning a logical block to a physical block, which logical block is composed of plural logical sectors to each of which a logical address for a host system is assigned;

a second search step of searching out a third physical block to which a logical block is assigned earliest among physical blocks to each of which a logical block is assigned;

a data writing step of, in response to a request issued by the host system, identifying a logical block including a logical sector corresponding to a logical address pertaining to the request and stores data provided from the host system in a physical block corresponding to the logical block identified;

a determination step of making a determination whether or not the number of program-erase cycles of the first physical block is larger by a predetermined value or more than the number of program-erase cycles of the third physical block; and a data transfer step of performing data transfer for transferring data stored in the third physical block to the second physical block;

wherein, when assigning a logical block to a physical block in the assignment step, making the determination in the determination step; and wherein, in a case where the determination is positive, assigning the logical block to the third physical block, in the assignment step, after completing the data transfer, wherein, in a case where the determination is negative, assigning the logical block to the first physical block in the assignment step.

6. A method for controlling access to one or more flash memories, in which data erasing is performed in physical blocks, comprising:
- a logical block management step of forming plural logical blocks each composed of plural logical sectors to each of which a logical address for a host system is assigned;
- a virtual block management step of forming plural virtual blocks into which physical blocks are divided;
- a program-erase cycles management step of managing the number of program-erase cycles of each virtual block;
- a first search step of searching out a first virtual block and a second virtual block, which first virtual block is a free virtual block of which the number of program-erase cycles is the smallest among free virtual blocks, which second virtual block is a free virtual block of which a number of program-erase cycles is the largest among free virtual blocks;
- an assignment step of assigning a logical block to a virtual block which logical block is composed of plural logical sectors to each of which a logical address for a host system is assigned;
- a second search step of searching out a third virtual block to which a logical block is assigned earliest among virtual blocks to each of which a logical block is assigned;
- a data writing step of, in response to a request issued by the host system, identifying a logical block including a logical sector corresponding to a logical address pertaining to the request and stores data provided from the host system in a virtual block corresponding to the logical block identified;
- a determination step of making a determination whether or not the number of program-erase cycles of the first virtual block is larger by a predetermined value or more than the number of program-erase cycles of the third virtual block; and
- a data transfer step of performing data transfer for transferring data stored in the third virtual block to the second virtual block;

wherein, when assigning a logical block to a virtual block in the assignment step, making the determination in the determination step; and wherein, in a case where the determination is positive, assigning the logical block to the third virtual block, in the assignment step, after completing the data transfer, wherein, in a case where the determination is negative, assigning the logical block to the first physical block in the assignment step.

* * * * *